United States Patent Office 3,366,683
Patented Jan. 30, 1968

3,366,683
METHOD FOR THE PRODUCTION OF
BENZYL ANILINES
Grannis S. Johnson, Englewood, and David E. Graham, Westfield, N.J., assignors to General Aniline & Film Corporation, New York, N.Y., a corporation of Delaware
No Drawing. Filed Oct. 23, 1963, Ser. No. 318,183
14 Claims. (Cl. 260—570.9)

The present invention relates, in general, to improved methods for the reductive amination of aromatic aldehydes, and in particular, relates to an improved method for the production of benzyl anilines of improved quality and yield by the catalytic reduction of aromatic nitro compounds in the presence of aromatic aldehydes.

While it is known to produce anilines by the catalytic hydrogenation of nitrobenzenes and to produce benzal anilines by the condensation of anilines with aldehydes as well as to produce benzyl anilines by the catalytic hydrogenation of benzal anilines, in separate steps, previous attempts to combine these three steps into an economical one-step method have resulted in procedures which are characterized by low yields due to side reactions resulting in impure products. For example, it has been reported by Emerson and Mohrman, J. Am. Chem. Soc. 62, 69 (1940) that the preparation of benzyl anilines, for example, by the catalytic hydrogenation of nitrobenzene in ethanol over a Raney nickel catalyst in the presence of benzaldehyde resulted in a 33% yield of product.

Accordingly, it is an object of this invention to provide an improved method for the reductive amination of aromatic aldehydes.

A further object of this invention resides in the provision of improved methods of producing benzyl anilines.

Yet another object of this invention is to provide an improved one-step process for the production of benzyl anilines by the catalytic reduction of aromatic nitro compounds in the presence of aromatic aldehydes.

Other objects and advantages of the invention will become further apparent from the following description of the invention.

The attainment of one or more objects of the invention is readily accomplished by reacting together in an inert aromatic solvent an aromatic aldehyde, an aromatic nitro compound and hydrogen in the presence of a hydrogenation catalyst. Additionally, it has been discovered that further economies and significant increases in yield of benzyl anilines are obtained by incorporating a drying agent into the reaction medium.

The reaction whereby benzyl anilines can be produced in accordance with the methods of the invention may be schematically illustrated, in the case of benzaldehyde and a nitro benzene, as follows:

(a) $C_6H_5NO_2 + 3H_2 \rightarrow C_6H_5NH_2 + 2H_2O$
(b) $C_6H_5NH_2 + OHCC_6H_5 \rightarrow C_6H_5N=CHC_6H_5$
(c) $C_6H_5N=CHC_6H_5 + H_2 \rightarrow C_6H_5NHCH_2C_6H_5$ As may be observed from the above reaction scheme stoichiometric or equimolar proportions of an aromatic nitro compound and an aromatic aldehyde are required and, while preferred, an excess of either can be employed if desired.

The methods of the invention are of wide general applicability with respect to the starting materials which can be employed therein. Usable aromatic nitro compounds generally are of the formula

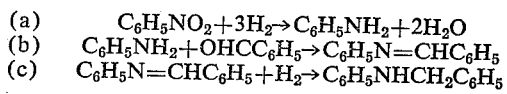

wherein $k$ is 1 to 3, $m$ is 0 to 3, X is methyl and Z is hydrogen, hydroxy, or amino. Thus, suitable nitro compounds include, for example, nitrobenzene, metadinitrobenzene, ortho - dinitrobenzene, para-dinitrobenzene, s-trinitrobenzene, as - trinitrobenzene, ortho-nitrotoluene, para - nitrotoluene, meta-nitrotoluene, 2,4-dinitrotoluene, 2,6 - dinitrotoluene, 2,4,6 - trinitrotoluene, 4-nitro-metaxylene, nitro mesitylene, ortho-nitrophenol, meta-nitrophenol, para-nitrophenol, 2,3-dinitrophenol, 2,6-dinitrophenol, 3,4 - dinitrophenol, 3,5 - dinitrophenol, 2,4,6-trinitrophenol, ortho-nitroaniline, meta-nitroaniline, paranitroaniline and the like. A preferred class of aromatic nitro compounds are the mono-nitrobenzenes.

Similarly, any aromatic aldehyde, whether containing one or more substituents in the aryl nucleus, is operative for purposes of the invention. Thus, the aromatic aldehyde may have the formula

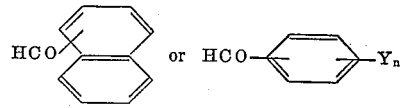

wherein $n$ is 0 to 2 and Y is hydrogen, chloro, bromo, methyl or methoxy. Suitable aromatic aldehydes include benzaldehyde, ortho-chlorobenzaldehyde, meta-chlorobenzaldehyde, para - chlorobenzaldehyde, 2,4-dichlorobenzaldehyde, 2,5-dichlorobenzaldehyde, 2,6-dichlorobenzaldehyde, ortho - bromobenzaldehyde, meta-bromobenzaldehyde, para - bromobenzaldehyde, ortho-toluylaldehyde, meta - toluylaldehyde, para - toluylaldehyde, ortho - methoxybenzaldehyde, para - methoxybenzaldehyde, napthaldehyde, terephthaldehyde. In general monocyclic aromatic aldehydes are preferred.

As pointed out above, the present invention is based on the discovery that substantial improvements in yield and quality of product are obtained by conducting the reaction in an inert aromatic solvent which is nonreactive with the other constituents of the reaction mixture.

Representative inert aromatic solvents which can be employed with facility in the operation of the methods of the invention include aromatic compounds such as benzene, chlorobenzene, ortho-dichlorobenzene, meta-dichlorobenzene, para-dichlorobenzene, toluene, ortho-chlorotoluene, meta-chlorotoluene, para-chlorotoluene, xylene, 3-chloro-ortho-xylene, 4-chloro-ortho-xylene, 2-chloro-para-xylene and the like. If desired mixture of solvents can be employed.

In carrying out the methods of the invention, it has been found convenient in some instances, as pointed out above, to employ a drying agent as an ingredient in the reaction mixture for the removal of the water formed during the reaction. Any suitable drying agent can be employed, i.e., one that will react with water or form hydrates. Typical and representative drying agents which can be employed include calcium chloride, calcium sulfate, magnesium sulfate, sodium sulfate and the like.

The hydrogenation catalyst employed in the methods of the invention is not necessarily a critical feature and may be selected from one or more of the various Group VI and Group VIII metals as well as the oxides and sulfides thereof, representative materials being the oxides and sulfides of molybdenum, tungsten, chromium and the like, together with such metals as nickel or cobalt and the various oxides and sulfides thereof. Also suitable as hydrogenation catalysts are certain Group I(B) or Group II(B) metals such as copper or cadmium and their oxides and sulfides. If desired, more than one hydrogenation catalyst can be employed, such as two or more of the oxides and/or sulfides of molybdenum, cobalt, nickel, copper, chromium and zinc. However, other hydrogenation catalysts such as active metals or oxides may be used. Thus, for example, Raney nickel or reduced nickel,

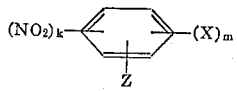

with or without suitable support or carrier, such as kieselguhr, majolica, alumna and the like may be employed. Preferred hydrogenation catalysts for use in the methods of the present invention are platinum, platinum oxide, platinum or palladium on charcoal or supported cobalt, as well as a supported nickel catalyst.

The temperature at which the reaction is carried out can be any convenient temperature since this has not been found to be necessarily critical with respect to the operation of the methods of the invention. Preferably, an elevated temperature of about 75° C. to about 200° C. will provide satisfactory results.

The reaction is carried out at a superatmospheric pressure. Any superatmospheric pressure can be employed since the reaction apparently has no hydrogen pressure requirement, thus low hydrogen pressure can be employed. Preferably, the hydrogen pressure employed in carrying out the reaction is about 75 pounds per square inch gauge although pressures above and below can be employed if desired. In general, a superatmospheric pressure in the range of from 50 to 500 pounds per square inch gauge will suffice.

In carrying out the reaction, the reactants and catalysts are charged to a pressure resistant vessel. The pressure resistant vessel is subsequently purged with nitrogen and/or hydrogen. The contents thereof are then heated to an elevated temperature as described above, and hydrogen applied at a constant pressure. The reaction is continued until the consumption of hydrogen is complete. Normally the period during which hydrogen is consumed will vary from a few hours to as much as a day. After the consumption of hydrogen has ceased the pressure resistant vessel is cooled and the contents thereof are discharged, filtered and distilled to remove excess aromatic aldehydes and any other low boiling components and the product taken as a residue component which can be further refined if desired.

The following examples will serve to illustrate the practice of the invention.

EXAMPLE 1

Preparation of benzyl aniline

To a steel shaker bomb there were charged 123 grams (1.0 mole) of nitrobenzene, 106 grams (1.0 mole) of benzaldehyde, 150 milliliters of ethanol and 6 grams of a nickel sponge paste hydrogenation catalyst. The shaker bomb was purged three times with nitrogen and then three times with hydrogen. The contents were heated to 100° C. and hydrogen applied at a constant pressure of 75 pounds per square inch gauge until it was observed that no further hydrogen was consumed. This required about 7 hours. The contents of the bomb were then cooled and discharged and the resultant mixture filtered free of catalyst and distilled. After removal of the solvent, ethanol, and other low boiling components there were obtained 57.6 grams of benzyl aniline which had a refractive index $N_D^{25}$ of 1.6165 in a 32% yield.

The above example illustrates the conventional attempt to combine the three steps into a one-step process. As may be observed a low yield of 32% of theory was obtained of a somewhat impure benzyl aniline.

In another experiment substituting a nickel hydrogenation catalyst for the nickel sponge paste above, there were obtained 66 grams of benzyl aniline having a refractive index of $N_D^{25}$ of 1.6083 which represented a yield of 36% of theory and an equally impure product.

EXAMPLE 2

Preparation of benzyl aniline

To a steel shaker bomb there were charged 123 grams (1.0 mole) of nitrobenzene, 106 grams (1.0 mole) of benzaldehyde, 300 milliliters of toluene and 6 grams of a nickel hydrogenation catalyst. The shaker bomb was purged with nitrogen and then with hydrogen and hydrogen applied at a constant pressure of 75 pounds per square inch gauge while the temperature of the shaker bomb was maintained at 100° C. The reaction was continued until the consumption of hydrogen had ceased. The contents of the bomb were cooled, discharged therefrom and filtered. The product was recovered as described in Example 1 and there was obtained 78 grams of benzyl aniline in a yield of 43% of theory.

EXAMPLE 3

Preparation of benzyl aniline

To a steel shaker bomb there were charged 106 grams (1.0 mole) of benzaldehyde, 123 grams (1.0 mole) of nitrobenzene, 300 milliliters toluene and 6 grams of a nickel hydrogenation catalyst. The shaker bomb was purged with nitrogen and then with hydrogen. The contents thereof were heated to 100° C. and hydrogen applied at a constant pressure of 75 pounds per square inch gauge until no further consumption of hydrogen took place. The contents thereof were heated to 100° C. and hydrogen applied at a constant pressure of 75 pounds per square inch gauge until no further consumption of hydrogen took place. The contents of the bomb were cooled, discharged therefrom and filtered. Benzyl aniline was isolated by fractional distillation of the filtered reaction mixture and there were provided 102 grams of benzyl aniline which was determined to be 99.5% pure by nitrate titration and was characterized by a refractive index $N_D^{25}$ of 1.6116. The yield was 56% of theory.

EXAMPLE 4

Preparation of N-2-chlorobenzyl-4-toluidine

To a steel shaker bomb there were charged 137 grams (1.0 mole) of para-nitrotoluene, 141 grams (1.0 mole) of orthochlorobenzaldehyde, 300 milliliters of toluene and 6 grams of a nickel hydrogenation catalyst. The shaker bomb was purged with nitrogen and then with hydrogen. The contents thereof were heated to 100° C. and hydrogen applied at a constant pressure of 75 pounds per square inch gauge until no further consumption of hydrogen took place. This required about 10 hours. The contents of the bomb were cooled, discharged therefrom and filtered. The product N-2-chlorobenzyl-4-toluidine was isolated for fractional distillation and there were recovered 117 grams of product having a boiling point of 170–175° C. at 5 millimeters of Hg absolute which represented a yield of 55% of theory.

EXAMPLE 5

Preparation of benzyl aniline

To a steel shaker bomb there were charged 106 grams (1.0 mole) of benzaldehyde, 123 grams (1.0 mole) of nitrobenzene, 300 milliliters of toluene, 6 grams of a nickel hydrogenation catalyst and 55 grams of anhydrous calcium chloride. The shaker bomb was purged three times with nitrogen and then three times with hydrogen. The contents thereof were heated to a temperature of 100° C. and shaking begun while hydrogen was applied at a constant pressure of 75 pounds per square inch gauge until it was observed that no further hydrogen was consumed. This required about 8 to 10 hours. The contents of the bomb were then cooled and discharged and the resultant mixture filtered free of catalyst. Separate layers of filtrate, a lower thick aqueous phase and an upper oily phase, were taken. The oily layer was distilled at atmospheric pressure to remove the toluene solvent and the remainder subsequently distilled at reduced pressure and there was collected a main fraction at 144–150° C. at 2 millimeters of Hg absolute. There was obtained 159 grams of benzyl aniline characterized by a refractive index $N_D^{25}$ of 1.6113 which represented a yield of 87.5% of theory. The purity of the sample was determined by nitrate titration to be 99.7%.

In a similar experiment analysis for nitrogen of the product was found to be 7.27% which compares favorably with the calculated value of 7.65%.

EXAMPLE 6

*Preparation of N-2-chlorobenzyl-4-toluidine*

To a steel shaker bomb there were charged 137 grams (1.0 mole) of para-nitrotoluene, 141 grams (1.0 mole) of orthochlorobenzaldehyde, 300 milliliters of toluene, 110 grams of anhydrous calcium chloride and 6 grams of a supported nickel hydrogenation catalyst. The shaker bomb was purged with nitrogen and then with hydrogen and the contents thereof heated to 100° C. and hydrogen applied at a constant pressure of 75 pounds per square inch gauge until it was observed that no further hydrogen was consumed. This required about 10 hours. The contents of the bomb were then cooled and discharged and the resultant mixture filtered free of catalyst. The upper oily layer of the filtrate was separated from the lower aqueous phase and distilled at atmospheric pressure to remove the toluene. After the toluene was removed the remainder was distilled at reduced pressure. There was collected 152 grams of a main fraction at a temperature of 170–177° C. at 5 millimeters of Hg absolute which represented a yield of 66% theory. The product was characterized by a melting point of 62–63° C., whereas the literature reports melting point for N-2-chlorobenzyl-4-toluidine to be 58–61° C. Elemental analysis was conducted on the product and the results were as follows:

Calculated: N, 6.05%; Cl, 15.35%. Found: N, 6.04%; Cl, 15.42%.

Various modifications of the invention will obviously occur to persons skilled in the art. Thus it is evident that in lieu of using the reactants, solvents and drying agents of the examples, any of the members of these classes mentioned in the specification can be employed with similar results. Therefore, it is not intended that the invention be limited in the patent granted except as necessitated by the appended claims.

What is claimed is:

1. A method for producing a benzyl aniline which comprises reacting, together in an inert aromatic hydrocarbon solvent, an aromatic nitro compound, of the formula

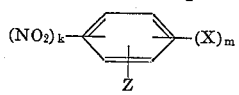

wherein $k$ is 1 to 3, $m$ is 0 to 3, X is methyl and Z is hydrogen, hydroxyl or amino, an aromatic aldehyde of the formula

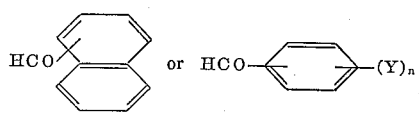

wherein $n$ is 0 to 2 and Y is hydrogen, chloro, bromo, methyl or methoxy and hydrogen in the presence of a hydrogenation catalyst.

2. A method for producing a benzyl aniline which comprises reacting, together, in an inert aromatic hydrocarbon solvent, hydrogen and equimolar quantities of an aromatic nitro compound of the formula

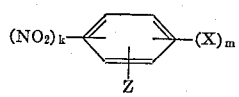

wherein $k$ is 1 to 3, $m$ is 0 to 3, X is methyl and Z is hydrogen, hydroxyl or amino and an aromatic aldehyde of the formula

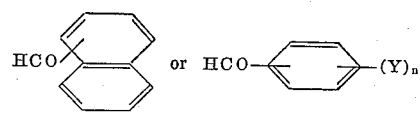

wherein $n$ is 0 to 2 and Y is hydrogen, chloro, bromo, methyl or methoxy in the presence of a hydrogenation catalyst.

3. The method according to claim 2 wherein the aromatic aldehyde is benzaldehyde and the aromatic nitro compound is nitrobenzene.

4. The method according to claim 2 wherein the aromatic aldehyde is ortho-chlorobenzaldehyde and the aromatic nitro compound is para-nitrotoluene.

5. The method according to claim 2 wherein the aromatic aldehyde is ortho-methoxybenzaldehyde and the aromatic nitro compound is ortho-nitrophenol.

6. The method according to claim 2 wherein the aromatic aldehyde is 2,4-dichlorobenzaldehyde and the aromatic nitro compound is ortho-nitroaniline.

7. A method for producing a benzyl aniline which comprises reacting, together, in the presence of a drying agent, in an inert aromatic hydrocarbon solvent, an aromatic nitro compound of the formula

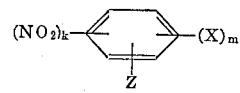

wherein $k$ is 1 to 3, $m$ is 0 to 3, X is methyl and Z is hydrogen, hydroxyl or amino, an aromatic aldehyde of the formula

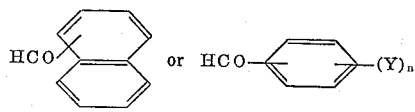

wherein $n$ is 0 to 2 and Y is hydrogen, chloro, bromo, methyl or methoxy and hydrogen in the presence of a hydrogenation catalyst.

8. The method according to claim 7 wherein the molar ratio of aromatic aldehyde to aromatic nitro compound is 1:1.

9. The method according to claim 8 wherein the drying agent is calcium chloride.

10. The method according to claim 9 wherein the aromatic aldehyde is benzaldehyde and the aromatic nitro compound is nitrobenzene.

11. The method according to claim 9 wherein the aromatic aldehyde is ortho-chlorobenzaldehyde and the aromatic nitro compound is para-nitrotoluene.

12. The method according to claim 9 wherein the aromatic aldehyde is ortho-methoxybenzaldehyde and the aromatic nitro compound is ortho-nitrophenol.

13. The method according to claim 9 wherein the aromatic aldehyde is 2,4-dichlorobenzaldehyde and the aromatic nitro compound is ortho-nitroaniline.

14. The method according to claim 8 wherein the hydrogenation catalyst is a member of the group consisting of platinum, platinum oxide, platinum and palladium on charcoal and nickel and cobalt on inert supports.

References Cited

Emerson et al., "Journal American Chemical Society," vol. 62, pp. 69–70 (1940).

CHARLES B. PARKER, *Primary Examiner.*

R. V. HINES, *Assistant Examiner.*